(12) United States Patent
Nichols et al.

(10) Patent No.: US 7,254,733 B2
(45) Date of Patent: Aug. 7, 2007

(54) METHOD OF SHUTTING DOWN VIRTUAL MACHINES IN AN ORDERLY MANNER

(75) Inventors: Stephen Richard Nichols, Endicott, NY (US); Damian Leo Osisek, Vestal, NY (US); William Romney White, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 830 days.

(21) Appl. No.: 10/370,210

(22) Filed: Feb. 18, 2003

(65) Prior Publication Data

US 2004/0199599 A1   Oct. 7, 2004

(51) Int. Cl.
*G06F 1/26* (2006.01)

(52) U.S. Cl. .................. 713/330; 713/300; 709/208

(58) Field of Classification Search ............ 713/300; 709/208
See application file for complete search history.

(56) References Cited

U.S. PATENT DOCUMENTS

| | | | | |
|---|---|---|---|---|
| 4,458,307 A | * | 7/1984 | McAnlis et al. | 714/22 |
| 5,151,855 A | * | 9/1992 | Gray et al. | 713/330 |
| 5,315,161 A | * | 5/1994 | Robinson et al. | 307/66 |
| 5,781,770 A | * | 7/1998 | Byers et al. | 713/502 |
| 5,862,394 A | * | 1/1999 | Watts et al. | 713/330 |
| 5,913,061 A | * | 6/1999 | Gupta et al. | 719/310 |
| 5,933,601 A | * | 8/1999 | Fanshier et al. | 709/223 |
| 6,021,262 A | | 2/2000 | Cote et al. | 395/185.01 |
| 6,425,001 B2 | | 7/2002 | Lo et al. | 709/217 |
| 6,457,142 B1 | | 9/2002 | Klemm et al. | 714/38 |

* cited by examiner

*Primary Examiner*—Chun Cao
*Assistant Examiner*—Vincent Tran
(74) *Attorney, Agent, or Firm*—Arthur J. Samodovitz

(57) ABSTRACT

A technique for shutting down virtual machines in a computer system which comprises a real computer and a virtual machine operating system. The virtual machine operating system comprises a common base portion and a plurality of virtual machines sharing the common base portion. According to one feature of the present invention, the common base portion receives a shutdown signal from the real computer. The shutdown signal specifies a time period for shutdown of the common base portion or the virtual machine operating system. Next, the common base portion determines a time period for shutdown of the virtual machines by subtracting a time required to shutdown the common base portion from the specified time period. Next, the common base portion sends requests to the virtual machines to shut down in an orderly manner within the time period determined for shutdown of the virtual machines. The common base portion determines when and if each of the virtual machines shuts down in an orderly manner. If all of the virtual machines shut down in an orderly maimer before the time period determined for shutdown of the virtual machines lapses, before lapse of the time specified in the shutdown signal from the real computer, the common base portion shuts itself down. However, if all of the virtual machines do not shut down in an orderly manner before the time period determined for shutdown of the virtual machines lapses, upon lapse of said time period determined for shutdown of the virtual machines, the common base portion shuts itself down. The shutting down of the common base portion disrupts any of the virtual machines that did not shut down in an orderly manner. The shutdown can also be initiated by a user at or an application running on one of the virtual machines.

4 Claims, 7 Drawing Sheets

FIG. 2

| Byte 0 | Event data length (x'09') | Event type (X'1D') Shutdown event timeout count | Event flags |
|---|---|---|---|
| Byte 4 | Reserved for future use | | |
| Byte 8 | Shutdown event timeout count units | | |

METHOD OF SHUTTING DOWN VIRTUAL MACHINES IN AN ORDERLY MANNER

The invention relates generally to computer systems and deals more particularly with a method and program to shut down virtual machines and other programs of the computer system in an orderly manner.

A "virtual machine" operating system is well known today. It comprises a common base portion and separate user portions, typically in the form of computer programs. In an IBM VM/ESA operating system and subsequent IBM z/VM operating system, the common base portion is called the "Control Program" or "CP" and the user portion is called a "virtual machine". A guest operating system runs on each virtual machine and typically supports many applications. Each virtual machine appears to the user and his or her applications as a real computer system.

Each virtual machine and its guest operating system run on one or more processors (collectively called a "CPU") of a real (i.e. physical) computer system. On certain occasions the real computer system will perform an action that will disrupt the virtual machines. This can be initiated by a human operator command or instruction of an application running in a privileged virtual machine which directs the CPU or common base portion to shut down. Therefore, it is best if all the virtual machines shut down in an orderly manner before the common base portion and the real computer system shut down. Otherwise, data may be lost and may have to be rebuilt. To compound the problem, often the CPU and common base portion are instructed to shut down within a predetermined amount of time. To further compound the problem, there are five "layers" in a virtual machine computer system, i.e., a CPU, common base portion, virtual machines, guest operating systems, and application programs.

Accordingly, an object of the present invention is to provide a method and program for shutting down virtual machines in an orderly manner.

A more specific object of the present invention is to provide a method and program for shutting down virtual machines in an orderly manner when (a) the common base portion is shutting down itself or (b) when the physical computer system on which the virtual machines are running is shutting down or performing another action that will disrupt the virtual machines.

Another object of the present invention is to provide a method and program to shut down an individual virtual machine or a set of virtual machines in an orderly manner when some other need arises.

SUMMARY OF THE INVENTION

The invention resides in a technique for shutting down virtual machines in a computer system which comprises a real computer and a virtual machine operating system. The virtual machine operating system comprises a common base portion and a plurality of virtual machines sharing the common base portion.

According to one feature of the present invention, the common base portion receives a shutdown signal from the real computer. The shutdown signal specifies a time period for shutdown of the common base portion of the virtual machine operating system. Next, the common base portion determines a time period for shutdown of the virtual machines by subtracting a time required to shutdown the common base portion from the specified time period. Next, the common base portion sends requests to the virtual machines to shut down in an orderly manner within the time period determined for shutdown of the virtual machines. The common base portion determines when and if each of the virtual machines shuts down in an orderly manner. If all of the virtual machines shut down in an orderly manner before the time period determined for shutdown of the virtual machines lapses, before lapse of the time specified in the shutdown signal from the real computer, the common base portion shuts itself down. However, if all of the virtual machines do not shut down in an orderly manner before the time period determined for shutdown of the virtual machines lapses, upon lapse of said time period determined for shutdown of the virtual machines, the common base portion shuts itself down. The shutting down of the common base portion disrupts any of the virtual machines that did not shut down in an orderly manner.

According to another feature of the present invention, the common base portion receives a shutdown request from a user of or an application running on one of the virtual machines. The shutdown request specifies a time period for shutdown of the common base portion of the virtual machine operating system. Then, the common base portion determines a time period for shutdown of the virtual machines by subtracting a time required to shutdown the common base portion from the specified time period. Next, the common base portion sends requests to the virtual machines to shut down in an orderly manner within the time period determined for shutdown of the virtual machines. The common base portion determines when and if each of the virtual machines shuts down in an orderly manner. If all of the virtual machines shut down in an orderly manner before the time period determined for shutdown of the virtual machines lapses, after shut down of all of the virtual machines but before lapse of the time specified in the shutdown signal from the user or privileged application, the common base portion shuts itself down. If all of the virtual machines do not shut down in an orderly manner before the time period determined for shutdown of the virtual machines lapses, upon lapse of the time period determined for shutdown of the virtual machines, the common base portion shuts itself down. The shutting down of the common base portion disrupts any of the virtual machines that did not already shut down in an orderly manner.

BRIEF DESCRIPTION OF THE FIGURES

FIG. 2 is a diagram showing a format of a shutdown signal used within the computer system of FIG. 1.

DETAILED DESCRIPTION OF THE PREFERRED EMBODIMENTS

Figure 1:
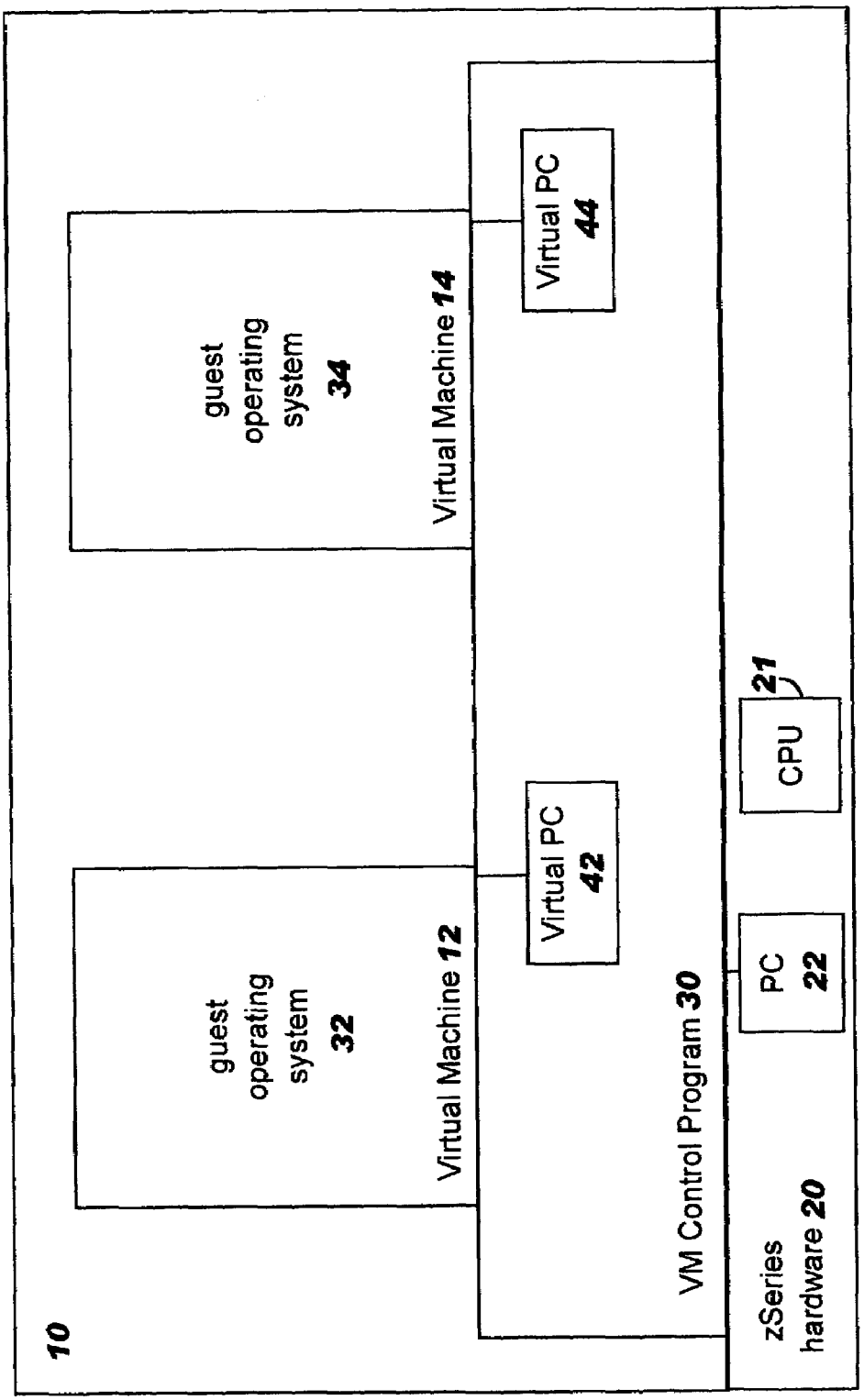
FIG. 1 is a block diagram of a virtual machine computer system according to the present invention.

Referring now to the figures in detail, wherein like reference numbers indicate like elements throughout, FIG. 1 illustrates a computer system generally designated 8 according to the present invention. Computer system 8 comprises a virtual machine operating system generally designated 10 and a physical or real computer 20 including a CPU 21. Operating system 10 runs on real computer 20. By way of example, virtual machine operating system 10 can be IBM z/VM version 4.3.0, although the present invention can be incorporated into other virtual machine operating systems as well. The details of the z/VM 4.3.0 operating system are disclosed in IBM publication "z/VM 4.3.0 General Information" (Document Number: GC24-5991-04) which is available from International Business Machines Corp. at PO Box 29570, IBM Publications, Raleigh, N.C. 27626-0570 or on the WWW at www.IBM.com/shop/publications/order. This publication is hereby incorporated by reference as part of the present disclosure. By way of example, the physical computer 20 is as an IBM zSeries mainframe, although the present invention can be incorporated into a virtual machine operating system which executes on other server computers or personal computers as well. Real computer 20 also includes a Processor Controller 22 that provides communication between the operating system 10 and the physical computer 20. Processor Controller 22 comprises a computer known as a "Support Element" that is part of a physical computer, and the manner of communication is a proprietary mechanism known as "Service-Call Logical Processor (SCLP)". The specific format and protocol of this communication are not important to the present invention as long as the following elements and function are provided: a mechanism to permit a CPU to present a request to the Support Element and a mechanism to permit the Support Element to present a request or a response to a CPU.

Virtual machine operating system 10 comprises user portions 12 and 14 (called "virtual machines" in the z/VM operating system) and common base portion 30 (called "CP" in the z/VM operating system). Although not shown, typically there are many other virtual machines, which also share common base portion 30. Each user portion 12 and 14 is capable of executing a guest operating system 32 and 34 as shown. By way of example, a copy of a Linux (TM of Linus Torvalds) operating system is running as a guest operating system on each user portion 12 and 14. Alternately, other guest operating systems such as z/OS can run on user portions 12 and 14. Associated with each virtual machine 12 and 14 is a virtual processor controller 42 and 44, respectively, that provides communication between the guest operating system 32 and 34 and the common base portion 30. The communication is in the form of a virtual analog of the SCLP mechanism. Being a "virtual analog" of the real SCLP, it provides the same elements and function as the real SCLP except that no actual additional hardware elements are required.

FIG. 2 illustrates an example of a shutdown signal generally designated 19. The shutdown signal has a unique event type identifier (for example, X'1D') to distinguish it from other events that may be presented through the SCLP mechanism. The shutdown signal also specifies a maximum timeout period (in the form of a "count" and "count units") for the shutdown to occur.

Figure 3:
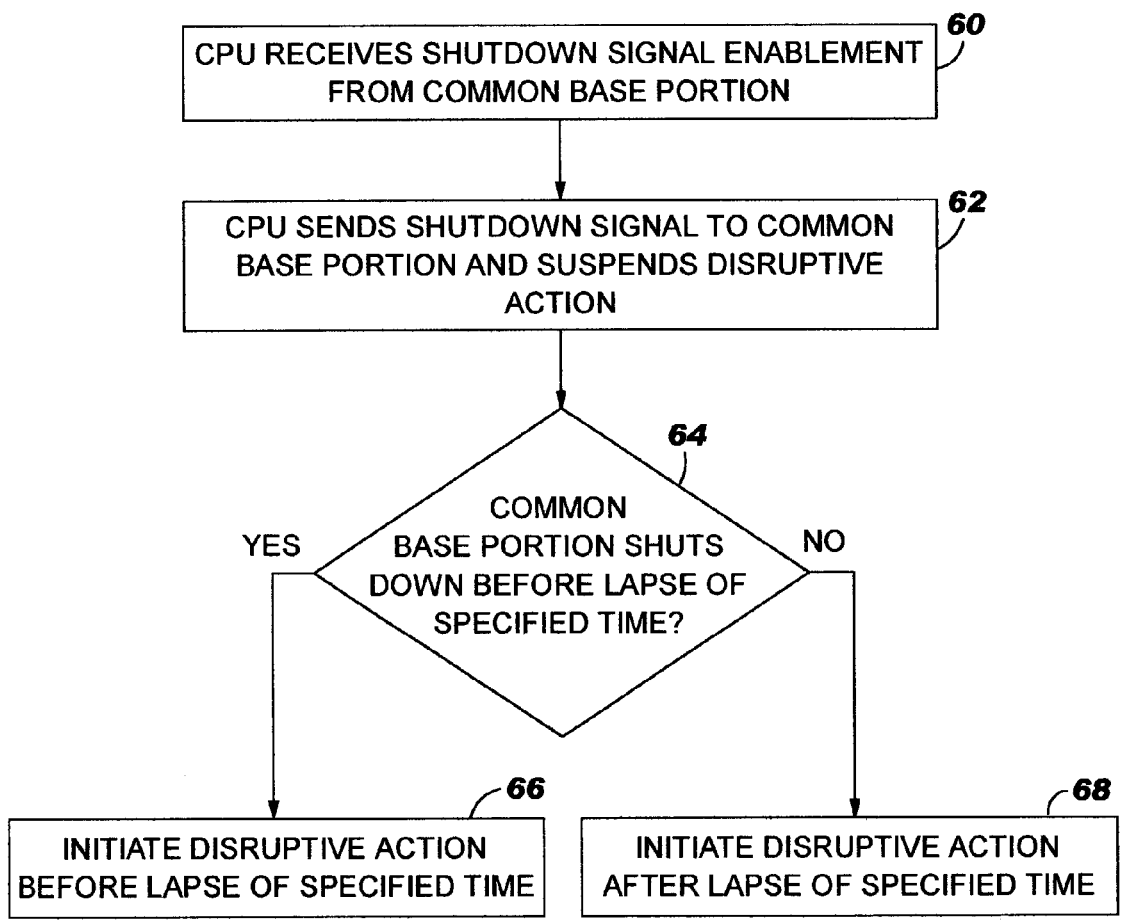
FIG. 3 is a flow chart illustrating processing of a shut down signal within a real computer of FIG. 1.

FIG. 3 illustrates initiation and processing of a shut down signal in physical computer 20. However, before a shut down signal can be sent to the common base portion in the illustrated embodiment, the common base portion 30 issues an instruction to the physical computer 20 through the processor controller 22 to permit it to receive a shutdown signal from the physical computer 20 (step 60). This is typically done during initial configuration of the common base portion. In other embodiments of the present invention, such "permission" is not required; CPU 21 can send shutdown signals to the common base portion at the will of the CPU. If an action that would be disruptive to the common base portion or the virtual machine(s) is subsequently initiated by physical computer 20, the CPU sends a shutdown signal to the common base portion through processor controller (step 62). Also, the CPU creates a time-out event and suspends the disruptive action. The disruptive action will be suspended during the entire timeout period unless the common base portion and all its virtual machines complete their orderly shutdown earlier, in which case the disruptive action will commence when the common base portion and all its virtual machines complete their orderly shutdown (step 62). In other words, if virtual machine operating system 10 enters a quiescent state indicative of an orderly shutdown before lapse of the timeout event, physical computer 20 cancels the timeout event and begins the disruptive action (step 66). If virtual machine operating system 10 does not enter a quiescent state by the end of the timeout period, physical computer 20 will begin the disruptive action anyway (step 68). Examples of disruptive actions by the physical computer are shutting down the physical computer 20 or reinitializing a logical partition of physical computer 20 in which the common base portion is running.

Figure 4:
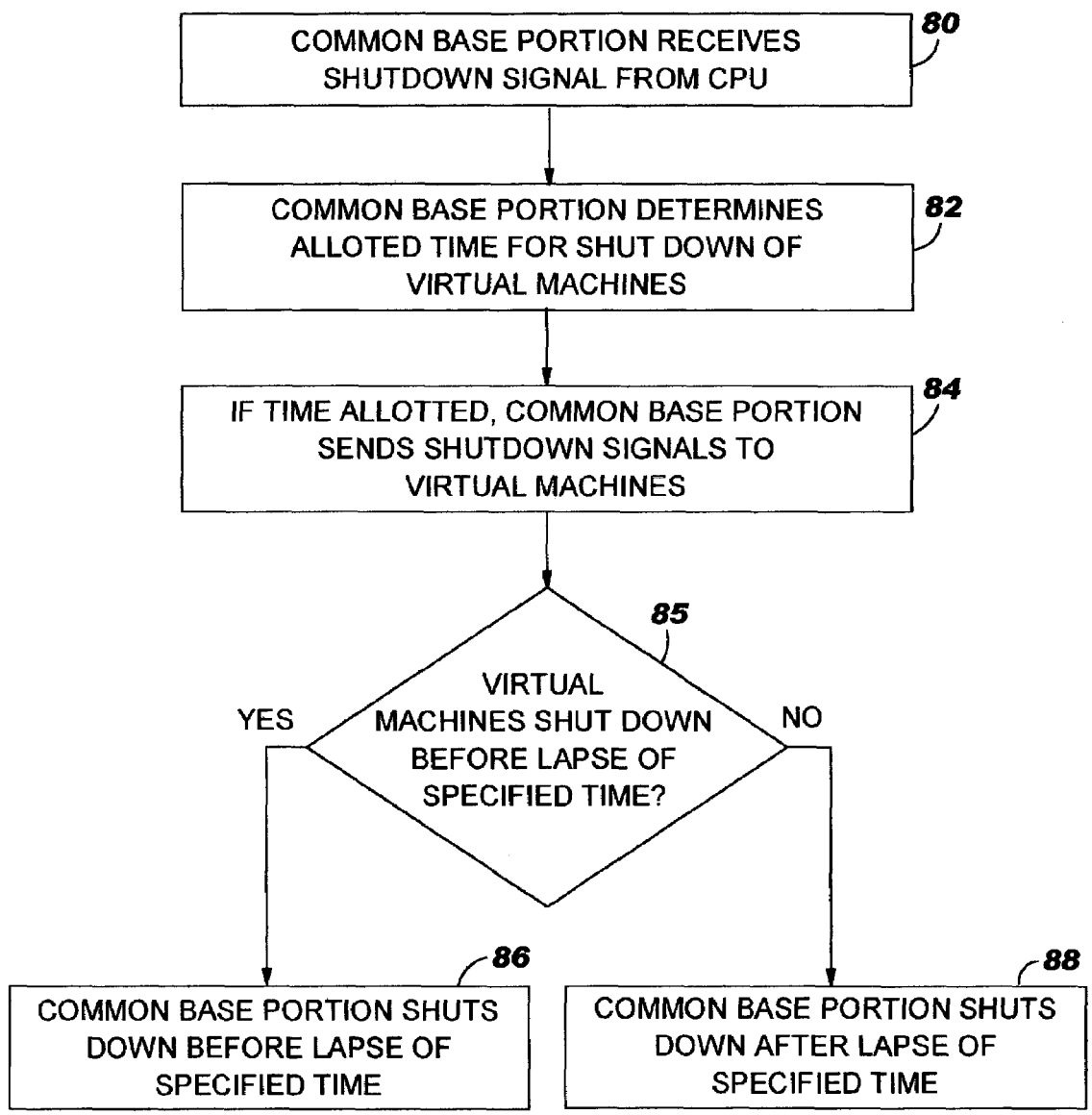
FIG. 4 is a flow chart illustrating processing of a shut-down signal within a common base portion of FIG. 1 when it receives and processes a shut down signal from the real computer of FIG. 3.

FIG. 4 illustrates steps taken by common base portion 30 in response to a shut down signal from the physical computer 20. This signal was sent by the physical computer 20 in step 62 of FIG. 3 and is received by the common base portion in step 80 of FIG. 4. The shutdown signal includes an indication of a total time available to shut down the common base portion and all its virtual machines. The common base portion determines from the shutdown signal the amount of time available for shutting down the virtual machines as follows: The common base portion knows how much time the common base portion requires to shut itself down. This information was provided during configuration of the common base portion. So, the common base portion subtracts from the time specified in the shutdown signal the amount of time required to shut down the common base portion 30 (step 82). If the result is positive, then there is time allotted to shut down the virtual machines. Thus, the common base portion uses the result to construct and send shut down signals to guest operating systems 32 and 34 of virtual machines 12 and 14 that are enabled to receive such signals (step 84). Common base portion also creates a timeout event to occur after the timeout period (i.e. the result of the subtraction) has elapsed (step 84). Each of the virtual machines notifies the common base portion when (and if) it shuts down. If all virtual machines 12 and 14 that were sent shutdown signals enter into a quiescent state (indicative of an orderly shut down) before the timeout period elapses (decision 85), the common base portion 30 shuts itself down at that time (enters a quiescent state) without waiting for lapse of the timeout period (step 86). Thus, the physical computer can shut down or can reinitialize the logical partition in which the common base portion is running without damaging the common base portion or its virtual machines. If all guest operating systems do not shut down in the specified period allotted to them, then the common base portion 30 shuts itself down when the timeout period elapses or slightly afterwards when the timeout event occurs (step 88). When the shutdown completes, the common base portion 30 enters a quiescent state (indicative of orderly shutdown). Thus, the physical computer can shut down or reinitialize the logical partition in which the common base portion is running without damaging the common base portion.

Figure 5:
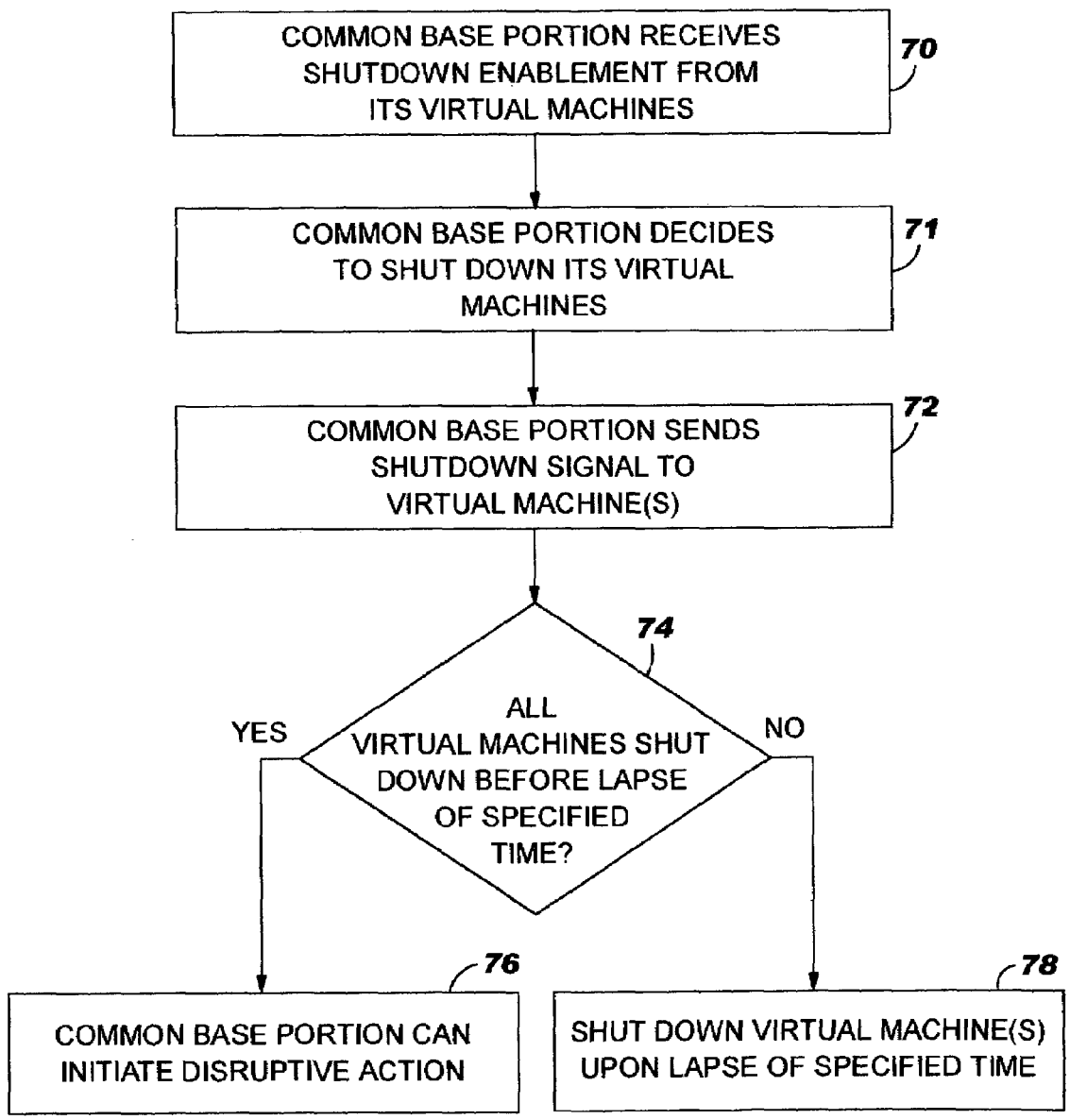
FIG. 5 is a flow chart illustrating processing of a shut-down signal within a common base portion of the computer system of FIG. 1 when the common base portion (not the real computer) initiates a shut down signal and sends the shutdown signal to the virtual machine(s).

FIG. 5 illustrates processing of a shutdown signal within the common base portion when the common base portion (not the CPU) initiates a shut down and sends the shutdown signal to the virtual machine(s). In the illustrated embodiment, the guest operating system 32 of virtual machine 12 previously issued an instruction to the common base portion 30 through the virtual processor controller 42 to enable it to receive a shutdown signal from the common base portion 30 (step 70). This is typically done during initial configuration of the guest operating system. In other embodiments of the present invention, such enablement is not required; shutdown signals can be sent from the common base portion to the guest operating system at the will of the common base portion. If the common base portion desires to initiate an action that would be disruptive to guest operating system 32 (step 71), common base portion 30 will first send a shutdown signal to guest operating system 32 through virtual processor controller 42 (step 72). The shutdown signal includes a time period for the shutdown, and the common base portion creates a corresponding timeout event. The time period is determined by the common base portion. Each of the virtual machines notifies the common base portion when (and if) it shuts down. The disruptive action is suspended until the timeout period has elapsed or earlier if the guest operating system shuts down in an orderly manner before timeout. In other words, if guest operating system 32 enters a quiescent state before the timeout period has elapsed (decision 74), the common base portion 30 cancels the timeout event and can initiate the disruptive action (step 76). (There is no need to wait the full timeout period.) Otherwise, the timeout period elapses, whereupon the common base portion 30 can initiate the disruptive action (step 78). Examples of disruptive events initiated by the common base portion are guest operating system termination, guest operating system reset, and guest operating system restart.

Figure 6:
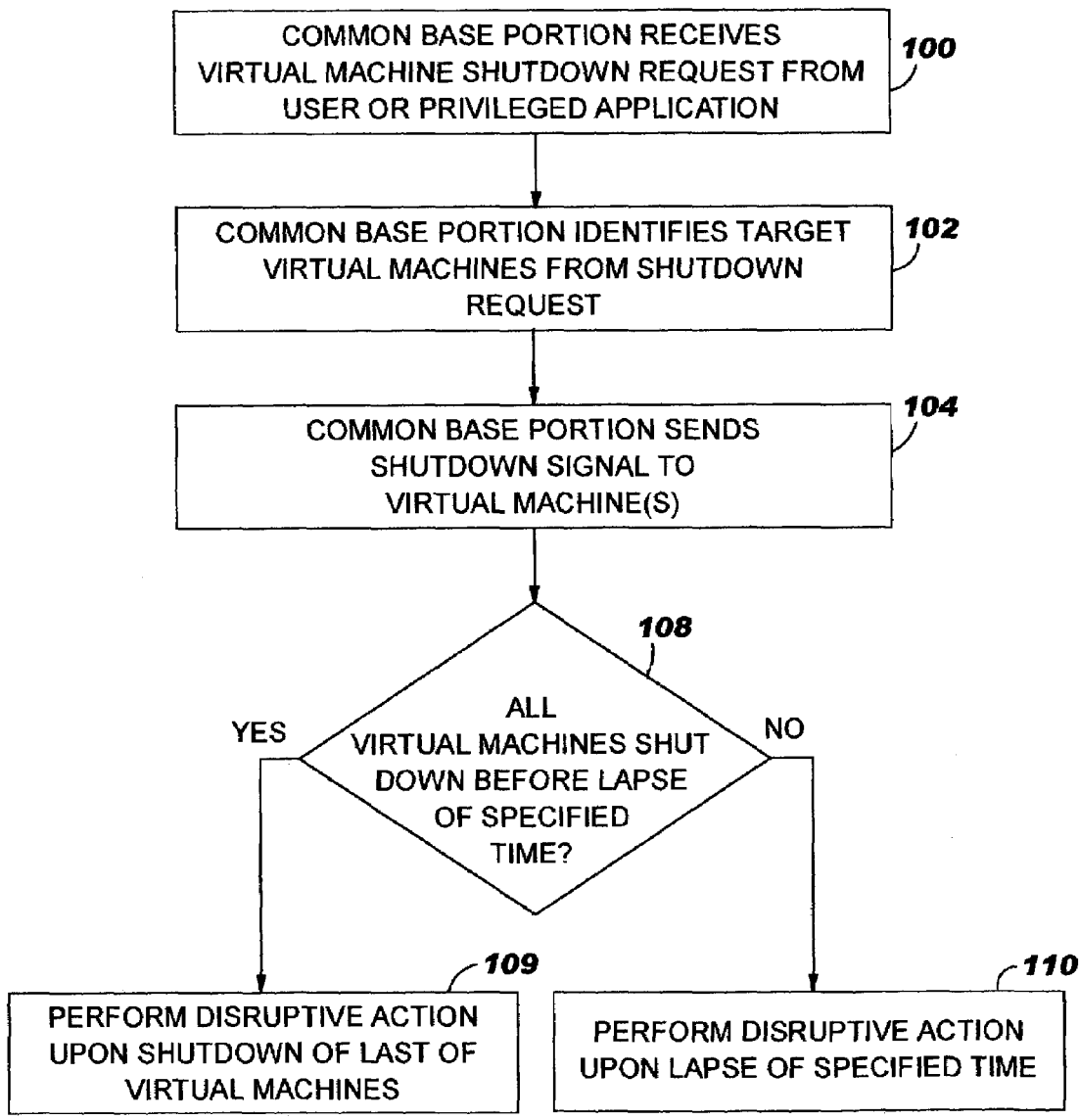
FIG. 6 is a flow chart illustrating processing of a Virtual Machine Shut Down signal within a common base portion of FIG. 1 when the common base portion receives the shut down signal from a human operator or privileged application.

FIG. 6 illustrates processing in the common base portion of a Virtual Machine Shutdown signal (called "Signal Shutdown" or "Force" in z/VM 4.3.0). This signal can be initiated by a human operator of or an application in a guest operating system or by a human operator of or an application in a privileged guest operating system. As explained in more detail below, the Virtual Machine Shutdown signal includes a deadline for shutdown of specified virtual machine(s); if the specified virtual machine(s) do not shutdown within the specified deadline, the common base portion can terminate the virtual machine(s) abruptly or perform another action that is disruptive to the specified virtual machine(s). The Virtual Machine Shutdown signal applies to virtual machines and not the common base portion. The common base portion is not directed to shutdown by this signal.

As illustrated in FIG. 6, the common base portion receives the Virtual Machine Shutdown signal (step 100) and identifies the virtual machine(s) indicated in the signal (step 102). If the designated virtual machine(s) are operating and are enabled to receive shutdown signals, the common base portion sends the shutdown signal to the guest operating system of the virtual machine(s) through virtual processor controller 42 or 44 (step 104). The common base portion also creates a timeout event to occur upon the deadline specified in the Virtual Machine Shutdown signal. Each of the virtual machines notifies the common base portion when (and if) it shuts down (decision 108). If all the designated virtual machine(s) shut down within the timeout period, the common base portion may perform an action that would have been disruptive to the specified virtual machine(s) (had they not shut down) when the last of the specified virtual machines shuts down, without waiting for lapse of the timeout period (step 109). If the designated virtual machine(s) do not shut down within the timeout period, the common base portion may abruptly terminate the specified virtual machine(s) or perform some other disruptive action at the conclusion of the timeout period (step 110). In one embodiment of the present invention, this "shut down" of virtual machines results in the virtual machines entering a quiescent state, but still existing. In another embodiment of the present invention, this "shut down" of virtual machines results in the common base portion terminating the virtual machines so they no longer exist.

Figure 7:
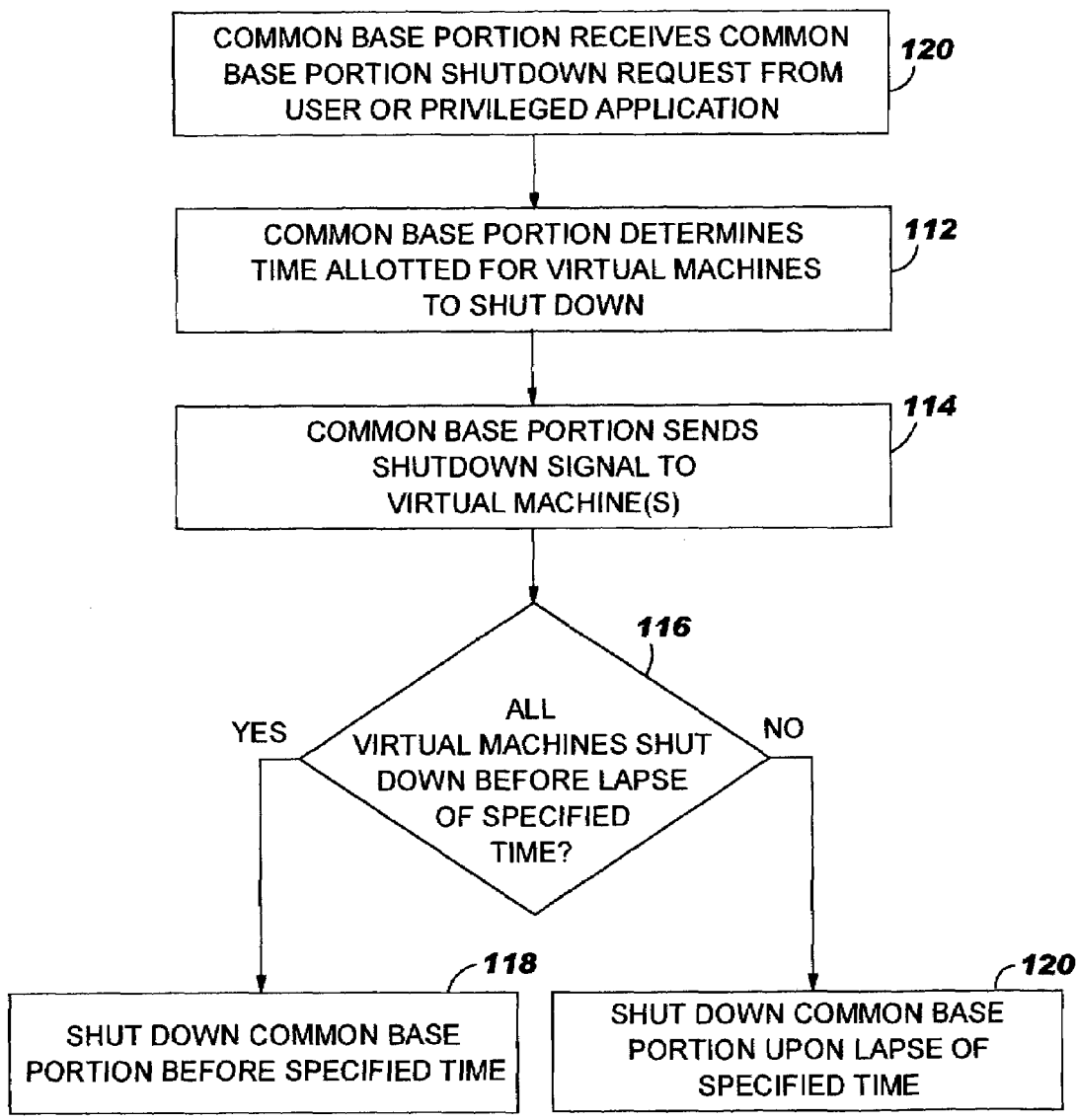
FIG. 7 is a flow chart illustrating processing of a Common Base Portion Shut Down signal within a common base portion of FIG. 1 when the common base portion receives the shut down signal from a human operator or privileged application.

FIG. 7 illustrates processing of a Common Base Portion Shutdown signal (simply called "Shutdown" in z/VM 4.3.0). A human operator of or an application in a privileged virtual machine can initiate a Common Base Portion Shutdown signal to shut down the common base portion and all its virtual machines. This signal includes a deadline for shutdown, which deadline is enforced. In other words, as explained below, even if the virtual machines do not shutdown in the specified time, they will be abruptly terminated by the common base portion, which will subsequently shut itself down immediately.

As illustrated in FIG. 7, after receiving the Common Base Portion Shutdown signal (step 110), the common base portion 30 determines the amount of time available for shutting down the specified virtual machines (step 112). This computation is performed by subtracting the amount of time required to shut down the common base portion itself from the amount of time specified in the Common Base Portion Shutdown signal. If the result is positive, the difference is allotted to the virtual machines to shut down. Thus, the common base portion uses the result to construct shutdown signals and send them to the guest operating systems of all the virtual machines running on the common base portion 30 that are enabled to receive such signals (step 114). Also, the common base portion establishes a timeout event to occur after the event timeout period has elapsed (step 114). Each of the virtual machines notifies the common base portion when (and if) it shuts down. If all the virtual machines that were sent shutdown signals enter into a quiescent state before the timeout event lapses (decision 116), the common base portion can then shut itself down without waiting for lapse of the timeout period (step 118). If any of the virtual machines that were sent the shutdown signals do not enter the quiescent state by the specified deadline, the timeout event will lapse (decision 116), and the common base portion 30 will shut itself down upon the lapse (step 120). This will abruptly terminate any virtual machine(s) that have not already entered the quiescent state.

Based on the foregoing, a method for orderly shutdown of virtual machines according to the present invention has been disclosed. However, numerous modifications and substitutions can be made without deviating from the scope of the present invention. For example, the existing implementation allows the use of commands and configuration files (which are not described here) to define the values of parameters that control the duration of shutdown signals. Therefore, the present invention has been disclosed by way of illustration and not limitation, and reference should be made to the following claims to determine the scope of the present invention.

The invention claimed is:

1. A method for shutting down virtual machines in a computer system comprising a real computer and a virtual machine operating system, said virtual machine operating system comprising a common base portion and a plurality of virtual machines sharing said common base portion, said method comprising the steps of:

receiving a shutdown signal from said real computer, said shutdown signal specifying a time period for shutdown of said common base portion or said virtual machine operating system;

determining a time period for shutdown of said virtual machines by subtracting a time required to shutdown said common base portion from the specified time period;

sending requests to said virtual machines to shut down in an orderly manner within said time period determined for shutdown of said virtual machines;

determining when and if each of said virtual machines shuts down in an orderly manner; and if all of said virtual machines shut down in an orderly manner before said time period determined for shutdown of said virtual machines lapses, before lapse of said time specified in said shutdown signal from said real computer, shutting down said common base portion, and if all of said virtual machines do not shut down in an orderly manner before said time period determined for shutdown of said virtual machines lapses, upon lapse of said time period determined for shutdown of said virtual machines, shutting down said common base portion, said shutting down of said common base portion disrupting any of said virtual machines that did not shut down in an orderly manner.

2. A method for shutting down a virtual machine operating system running on a real computer, said virtual machine operating system comprising a common base portion and a plurality of virtual machines sharing said common base portion, said method comprising the steps of:

receiving a shutdown signal from a user of or an application on one of said virtual machines, said shutdown signal specifying a time period for shutdown of said common base portion or said virtual machine operating system;

determining a time period for shutdown of said virtual machines by subtracting a time required to shutdown said common base portion from the specified time period;

sending requests to said virtual machines to shut down in an orderly manner within said time period determined for shutdown of said virtual machines determining when and if each of said virtual machines shuts down in an orderly manner; and if all of said virtual machines shut down in an orderly manner before said time period determined for shutdown of said virtual machines lapses, after shut down of all of said virtual machines but before lapse of said time specified in said shutdown signal from said user or privileged application shutting down said common base portion, and if all of said virtual machines do not shut down in an orderly manner before said time period determined for shutdown of said virtual machines lapses, upon lapse of said time period determined for shutdown of said virtual machines, shutting down said common base portion, said shutting down of said common base portion disrupting any of said virtual machines that did not already shut down in an orderly manner.

3. A method for shutting down virtual machines in a computer system comprising a real computer and a virtual machine operating system, said virtual machine operating system comprising a common base portion and a plurality of virtual machines controlled by said common base portion, said method comprising the steps of:

receiving a shutdown signal from said real computer, said shutdown signal specifying a time period for shutdown of said common base portion or said virtual machine operating system;

determining a time period for shutdown of said virtual machines by subtracting a time reserved for shutdown of said common base portion from the specified time period;

sending requests to said virtual machines to shut down in an orderly manner within said time period determined for shutdown of said virtual machines; and if all of said virtual machines shut down in an orderly manner before lapse of said time period determined for shutdown of said virtual machines, shutting down said common base portion before lapse of said time specified in said shutdown signal from said real computer, and if all of said virtual machines do not shut down in an orderly manner before lapse of said time period determined for shutdown of said virtual machines, shutting down said common base portion upon lapse of said time period determined for shutdown of said virtual machines, said shutting down of said common base portion disrupting any of said virtual machines that did not shut down in an orderly manner.

4. A computer system for controlling virtual machines, said computer system comprising a real computer and a virtual machine operating system, said virtual machine operating system comprising a common base portion and a plurality of virtual machines controlled by said common base portion, said computer system comprising:

means for receiving a shutdown signal from said real computer, said shutdown signal specifying a time period for shutdown of said common base portion or said virtual machine operating system;

means for determining a time period for shutdown of said virtual machines by subtracting a time reserved for shutdown of said common base portion from the specified time period;

means for sending requests to said virtual machines to shut down in an orderly manner within said time period determined for shutdown of said virtual machines; and means, responsive to all of said virtual machines shutting down in an orderly manner before lapse of said time period determined for shutdown of said virtual machines, for shutting down said common base portion before lapse of said time specified in said shutdown signal from said real computer, and means, responsive to all of said virtual machines not shutting down in an orderly manner before lapse of said time period determined for shutdown of said virtual machines, for shutting down said common base portion upon lapse of said time period determined for shutdown of said virtual machines, said shutting down of said common base portion disrupting any of said virtual machines that did not shut down in an orderly manner.

* * * * *